United States Patent
Breun et al.

(10) Patent No.: US 8,393,447 B2
(45) Date of Patent: Mar. 12, 2013

(54) VIBRATION DAMPER WITH AMPLITUDE-SELECTIVE DAMPING FORCE

(75) Inventors: Wolfgang Breun, Niederwerrn (DE);
Marcus Kirchner, Würzburg (DE);
Hans Gonschorrek, Bergrheinfeld (DE);
Valentin Harwardt, Sennfeld (DE)

(73) Assignee: ZF Friedrichafen AG, Friedrichshafen (DE)

( * ) Notice: Subject to any disclaimer, the term of this patent is extended or adjusted under 35 U.S.C. 154(b) by 676 days.

(21) Appl. No.: 12/077,393

(22) Filed: Mar. 19, 2008

(65) Prior Publication Data
US 2008/0230334 A1  Sep. 25, 2008

(30) Foreign Application Priority Data
Mar. 20, 2007  (DE) .................. 10 2007 013 888

(51) Int. Cl.
*F16F 9/34* (2006.01)
*F16F 9/48* (2006.01)
(52) U.S. Cl. ..................... 188/282.1; 188/284
(58) Field of Classification Search ............ 188/322.15, 188/281, 282.1, 282.5, 282.6, 284
See application file for complete search history.

(56) References Cited

U.S. PATENT DOCUMENTS

| | | | |
|---|---|---|---|
| 6,039,159 A | 3/2000 | Öhlin et al. | |
| 6,561,326 B2 | 5/2003 | Götz | |
| 7,441,639 B2 * | 10/2008 | Gotz et al. | 188/316 |
| 7,628,256 B2 * | 12/2009 | Krefeld | 188/282.1 |
| 2005/0109571 A1 * | 5/2005 | Burkert et al. | 188/322.15 |
| 2005/0230202 A1 | 10/2005 | Nevoigt et al. | |
| 2006/0060079 A1 * | 3/2006 | Wilhelm et al. | 92/109 |
| 2007/0125610 A1 * | 6/2007 | Goetz et al. | 188/282.1 |

FOREIGN PATENT DOCUMENTS

| | | |
|---|---|---|
| DE | 199 48 800 | 5/2001 |
| DE | 10 2004 015 065 | 10/2005 |
| DE | 10 2004 034 057 | 2/2006 |
| DE | 102005055801 | * 2/2007 |
| FR | 1 387 104 | 1/1965 |

OTHER PUBLICATIONS

Search Report dated Mar. 30, 2007 issued for the corresponding German Patent Application No. 10 2007 013 888.3.

* cited by examiner

*Primary Examiner* — Bradley King
*Assistant Examiner* — Vishal Sahni
(74) *Attorney, Agent, or Firm* — Cozen O'Connor

(57) ABSTRACT

A vibration damper includes a damping medium filled cylinder in which a piston rod carrying a working piston is guided with freedom of axial movement, the working piston dividing the cylinder into two working spaces. The piston rod forms a housing having an inside wall, the housing having first and second working chambers separated by a separating piston, the first working chamber being connected to one of the working spaces to provide amplitude selective damping as the working piston moves in the cylinder. The separating piston is spaced from the inside wall to form an annular gap in which a pressure gradient develops when the piston rod moves, thereby causing the separating piston to move in the housing, the separating piston being radially expandable to close the gap when sufficient pressure develops in one of the working chambers.

10 Claims, 3 Drawing Sheets

VIBRATION DAMPER WITH AMPLITUDE-SELECTIVE DAMPING FORCE

BACKGROUND OF THE INVENTION

1. Field of the Invention

The invention pertains to a vibration damper of the type including a damping medium filled cylinder in which a piston rod carrying a working piston is guided with freedom of axial movement, the working piston dividing the cylinder into two working spaces, and a housing having first and second working chambers separated by a separating piston, the first working chamber being connected to one of the working spaces to provide amplitude selective damping as the working piston moves in cylinder.

2. Description of the Related Art

DE 10 2004 034 057 B4 and DE 10 2004 015 065 A1 describe vibration dampers with amplitude-selective damping force. Inside a housing, a separating piston, which is supported with freedom to slide back and forth and which separates two working chambers. Each working chamber has a flow connection with a single working space, where the two working spaces are separated from each other by a damping force. The piston is equipped with damping valves, where the amplitude-selective damping device with the housing and the separating piston acts hydraulically in parallel with the damping valves in question.

The separating piston has an elastomeric body, which is intended to suppress noise in the end-contact position. A seal is present between the separating piston and the inside wall to prevent leakage. A radially outer reinforcing ring gives the separating piston rigidity in the area of the seal, so that the seal is effective at all times.

The seal on the separating piston and the associated friction against the inside wall of the housing, however, can decrease to an undesirable level the sensitivity with which the amplitude-selective damping responds.

US 2005/0230202 describes a vibration damper with basically the same design. To provide the amplitude-selective damping, it has a foam body in the housing. The foam body fills the entire volume of the housing. When the piston rod moves, there is no flow between the working spaces of the vibration damper; instead, there is only a one-sided compression of the foam body.

At high piston rod speeds, the jet of damping medium coming from the flow connection and acting on the foam body has a highly abrasive effect, so that separated particles can enter the damping valves and interfere with their proper operation.

SUMMARY OF THE INVENTION

An object of the present invention is to provide a sensitively responding, amplitude-selective damping device which avoids the production of noise and is long-lasting.

According to the invention, the separating piston cooperates with the inside wall of the housing to form an annular gap, the size of which is calculated so that, when the piston rod moves, a pressure gradient develops in the annular gap. The separating piston, after having been displaced by a defined distance in the housing, is elastically expanded in the radial direction by the effective pressure present in the working chamber, as a result of which the deformed volume components of the separating piston close the annular gap.

The great advantage is that, as a result of the annular gap, there are no frictional forces which could hinder the axial movement of the separating piston. As a result of the axial mobility of the separating piston, the deformability must be sufficient merely to ensure that the annular gap will be sealed off; there is no need for any significant increase in the volume of the piston in the working space.

Preferably, the separating piston consists entirely of deformable material.

It is also possible, however, for the separating piston to have internal reinforcement. Through the design of the reinforcement, the deformability and the deformation direction of the elastic area of the separating piston can be influenced.

An alternative possibility is to design the separating piston as a hollow body. The wall thickness of the separating piston will determine its deformability.

In addition, the hollow body can be filled with a fluid. Partially filling the hollow body makes it possible to counteract the mass inertia of the separating piston.

There is also the possibility of designing the separating piston with a hollow profile in the direction facing a stop surface, which limits the displacement distance. The hollow profile cooperates with the stop surface to provide damping medium-controlled end-position damping. The end-position damping has the effect of helping to prevent the generation of noise.

For example, the separating piston can have a ring-shaped stop profile in the direction facing at least one stop surface. Damping medium is present within the ring-shaped stop profile, and this damping medium is squeezed out toward the still-open annular gap as the piston approaches and makes contact with the stop.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
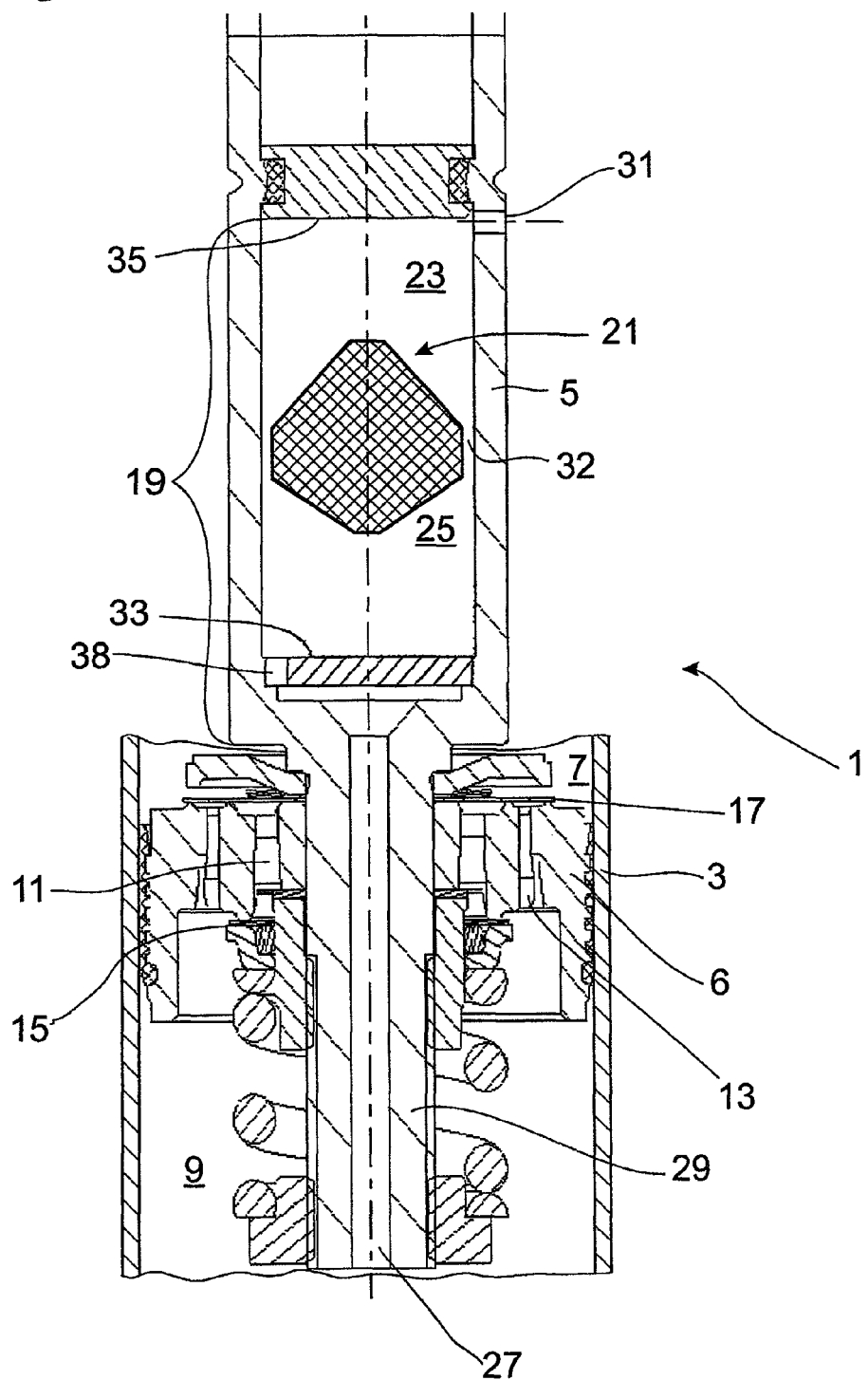
FIGS. 1 and 1A show a partial cross section of a vibration damper with amplitude-selective damping force.

FIG. 1 shows part of a vibration damper 1, in the damping medium-filled cylinder 3 of which a piston rod 5 is guided with freedom of axial movement. A piston 6 divides the cylinder into a working space 7 on the piston rod side of the piston and a working space 9 on the side of the piston facing away from the piston rod, where a damping valve, in this case formed by a pass-through cross section 11, 13, is provided for each direction of piston rod movement. The ends of each of these cross sections are covered at least partially by at least one valve disk 15, 17.

Inside the working space 7 piston rod is formed with a housing 19, in which a separating piston 21 is installed with freedom of axial movement. The separating piston, which consists entirely of an elastomeric compound or a foamed material, divides the housing 19 into two working chambers 23, 25, also filled with damping medium. The lower working chamber 25 is connected to the working space 9 on the side of piston facing away from the piston rod by a flow connection 27 in the form of an axial channel inside a piston rod journal 29. There is also a connecting opening 31 between the piston rod-side working space 7 and the upper working chamber 23. Via the flow connection 27 and the connecting opening 31, changes in the volumes in the two working chambers 23, 25 are compensated, so that the working chambers are always filled with damping medium.

Between the separating piston 21 and the inside wall of the housing 19, there is an annular gap 32, the size of which is calculated so that, when the piston rod moves, a pressure gradient develops between the two working chambers 23, 25.

Figure 1A:
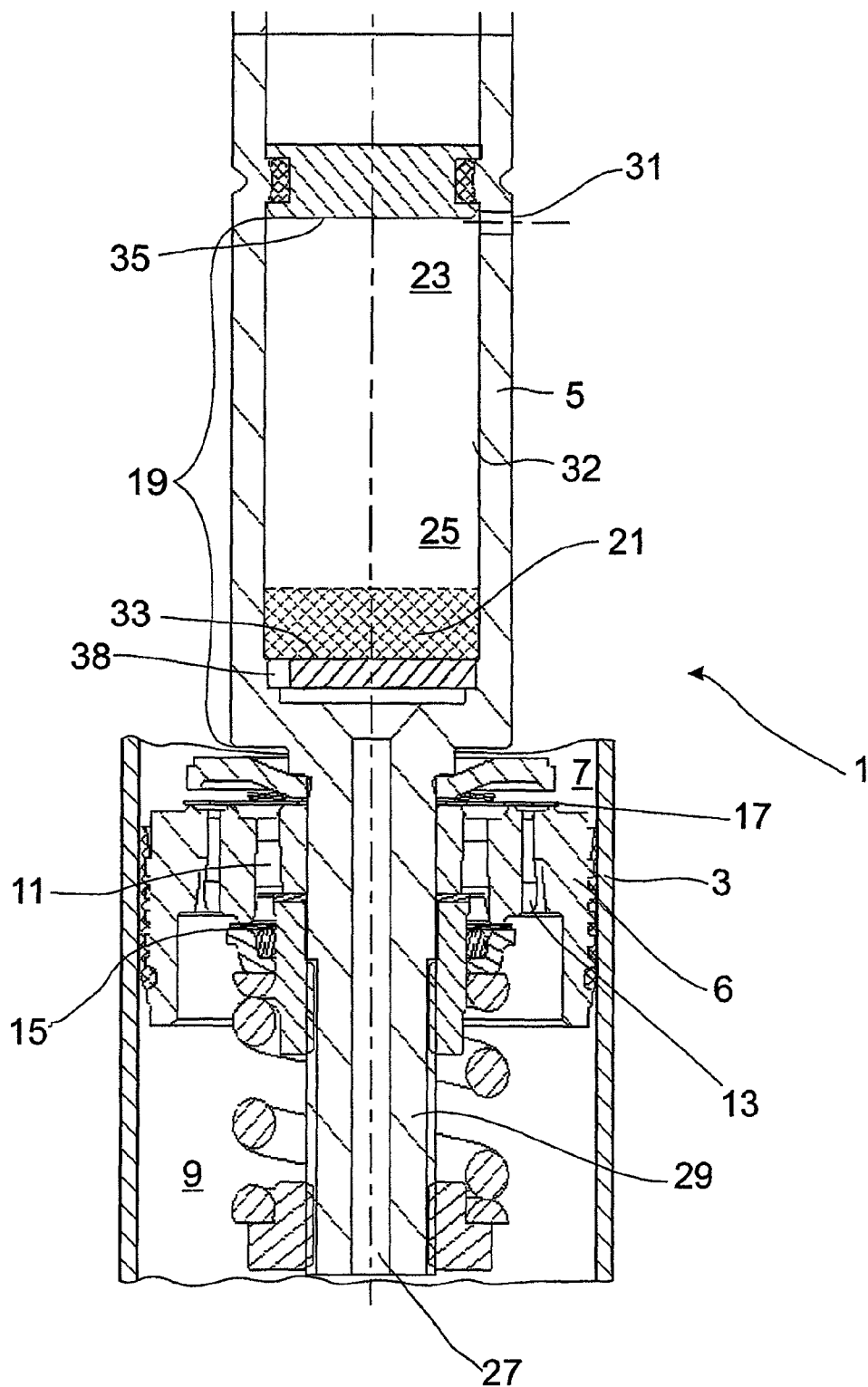

When the piston rod moves upward and the separating piston 21 is in a central starting position, the displaced damping medium is accepted by the working chamber 23, and the separating piston 21 is thus displaced by a certain amount. As soon as the separating piston has reached a bottom piece 33 or, if the piston rod is moving inward, has reached a cover 35 of the housing 19, the separating piston 21 is expanded elastically in the radial direction by the effective pressure present in the working chamber 23, as a result of which the thus-deformed volume parts of the separating piston 21 close off the annular gap 32, as indicated by the illustration of the separating piston in broken line in FIG. 1A.

In the bottom piece 33, there is an outlet 38, via which the remaining damping medium can leave the working chamber 25 and pass via the flow connection 27 to the working space 9 on the side of the piston facing away from the piston rod. It is not possible, however, for any new damping medium to flow in from the working chamber 23. As the piston rod continues to move, therefore, the damping valves 11, 15 or 13, 17 open.

Figure 2:
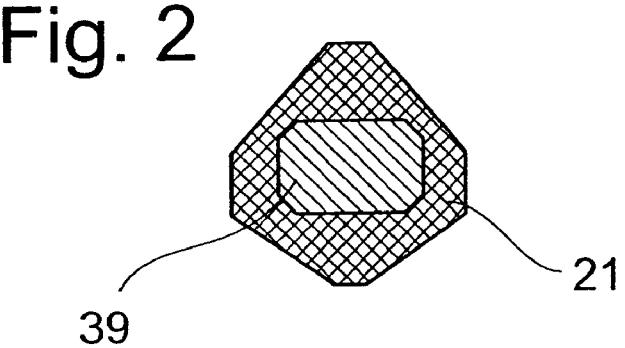
FIGS. 2-4 show additional embodiments of the separating piston.

FIG. 2 shows a separating piston 21 with a disk-like reinforcement 39 in the area of the largest diameter of the separating piston 21. In the area of the outside diameter of the reinforcement, the wall thickness of the elastomeric or foamed body is very small. As a result, the production-related shrinkage which occurs in this area of the separating piston 21 is very small, which means that the separating piston can be produced with a very precise diameter here.

Figure 3:
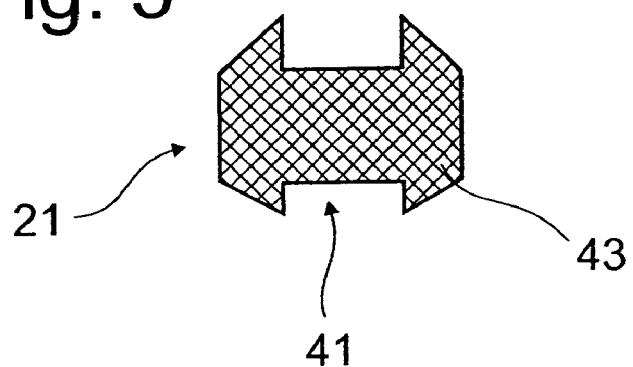

The variant according to FIG. 3 shows a separating piston 21, which, in the direction facing a stop surface limiting the displacement distance, i.e., the bottom piece 33 or the cover 35, is designed with a hollow profile 41 in the form of a ring-shaped stop profile 43 on its top and/or bottom surface. In this concrete embodiment, the separating piston 21 has an H-shaped cross section. When the stop profile 43 comes to rest on, for example, the bottom piece 33 (FIG. 1), the damping medium trapped in the stop profile is displaced radially toward the outlet 38, as a result of which a hydraulic end-position damping effect is achieved.

Figure 4:
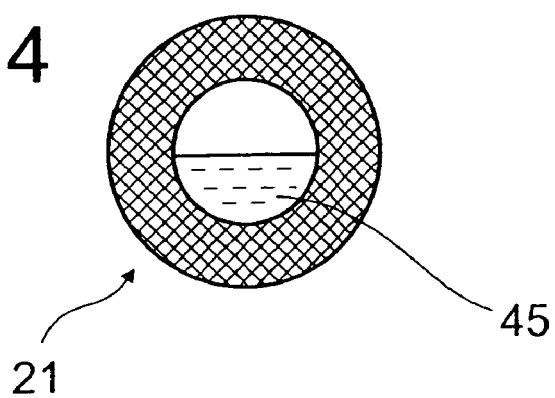

FIG. 4 shows a separating piston 21, which is designed as a hollow body and which, for example, can have a spherical shape. The hollow body can contain a fluid 45 or a gel. Filling the hollow body partially makes it possible to influence the mass moment of inertia of the separating body.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
    a damping medium filled cylinder in which a piston rod carrying a working piston is guided with freedom of axial movement, the working piston dividing the cylinder into a working space on the piston rod side and a working space away from the piston rod; and
    a housing having an inside wall, a cover, and a bottom piece arranged opposite the cover, the housing having first and second working chambers separated by a separating piston, that is moveably arranged in the housing, the first working chamber being connected to one of the working spaces to provide amplitude selective damping as said working piston moves in said cylinder,
    wherein the separating piston is spaced from the inside wall to form an annular gap in which a pressure gradient develops when the piston rod moves, the separating piston being radially expandable to close the gap when at least one of sufficient pressure develops in one of the working chambers and when the separating piston contacts one of the cover and the bottom piece,
    wherein the working piston comprises:
        first and second pass through cross sections arranged between the first and the second working spaces; and
        first and second valve disks arranged to at least partially cover respective axial ends of the first and the second pass through cross sections, wherein the first and second valve disks are open at least when the gap is closed,
    whereby the first and the second working spaces are connected to at least one of the annular gap and the first and the second pass through cross sections.

2. The vibration damper of claim 1 wherein the separating piston consists of elastomeric material.

3. The vibration damper of claim 1 wherein the separating piston is a composite material, having internal reinforcement.

4. The vibration damper of claim 1 wherein the separating piston comprises a hollow body.

5. The vibration damper of claim 1 wherein the hollow body is filled with a fluid.

6. The vibration damper of claim 1 wherein the housing has axially opposite stop surfaces which limit travel of the separating piston.

7. The vibration damper of claim 6 wherein the separating piston is formed with a recess facing at least one of said stop surfaces.

8. The vibration damper of claim 7 wherein the separating piston has a ring-shaped stop profile surrounding the recess.

9. The vibration damper of claim 1 wherein the housing is formed by the piston rod.

10. The vibration damper of claim 1 wherein the first and second pass through cross sections are substantially parallel to the annular gap.

* * * * *